(12) United States Patent
Sakai et al.

(10) Patent No.: US 9,511,984 B2
(45) Date of Patent: Dec. 6, 2016

(54) INDUSTRIAL VEHICLE

(71) Applicant: KABUSHIKI KAISHA TOYOTA JIDOSHOKKI, Aichi-ken (JP)

(72) Inventors: Takashi Sakai, Kariya (JP); Takahisa Sugimoto, Kariya (JP); Shintaro Watanabe, Kariya (JP); Hidefumi Oishi, Kariya (JP); Hiromi Ueda, Kariya (JP); Naoto Morisaku, Kariya (JP); Kazuki Maeda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 14/420,775

(22) PCT Filed: Aug. 9, 2013

(86) PCT No.: PCT/JP2013/071666
§ 371 (c)(1),
(2) Date: Feb. 10, 2015

(87) PCT Pub. No.: WO2014/027622
PCT Pub. Date: Feb. 20, 2014

(65) Prior Publication Data
US 2015/0203339 A1    Jul. 23, 2015

(30) Foreign Application Priority Data

Aug. 13, 2012   (JP) ................................. 2012-179397

(51) Int. Cl.
*B60K 25/00*   (2006.01)
*B66F 9/075*   (2006.01)
(Continued)

(52) U.S. Cl.
CPC ............. *B66F 9/07531* (2013.01); *B60K 1/04* (2013.01); *B66F 9/07554* (2013.01);
(Continued)

(58) Field of Classification Search
None
See application file for complete search history.

(56) References Cited

U.S. PATENT DOCUMENTS 5,212,024 A    5/1993   Klink et al.
5,456,994 A   10/1995   Mita
(Continued)

FOREIGN PATENT DOCUMENTS

JP    05-5681      1/1993
JP    10-266272   10/1998
(Continued)

OTHER PUBLICATIONS

U.S. Appl. No. 14/426,839 to Hidefumi Oishi et al., filed Mar. 9, 2015.
(Continued)

*Primary Examiner* — John Walters
*Assistant Examiner* — Hilary L Johns
(74) *Attorney, Agent, or Firm* — Greenblum & Blumstein, P.L.C.

(57) ABSTRACT

An industrial vehicle is provided with a vehicle body, battery cells, which are the electric power source for the industrial vehicle and are located within the vehicle body, and a counterweight, which is located within the vehicle body. The counterweight has a weight portion and a weight body that extends from the weight portion. The battery cells are provided on both sides of the weight body and are thermally coupled to the weight body.

11 Claims, 5 Drawing Sheets

(51) Int. Cl.
*B60K 1/04* (2006.01)
*H01M 2/10* (2006.01)
*B60K 7/00* (2006.01)
*B60K 1/00* (2006.01)

(52) U.S. Cl.
CPC ....... *H01M 2/1077* (2013.01); *H01M 2/1083* (2013.01); *B60K 7/0007* (2013.01); *B60K 25/00* (2013.01); *B60K 2001/005* (2013.01); *B60K 2007/0061* (2013.01); *B60Y 2200/15* (2013.01); *H01M 2220/20* (2013.01)

(56) References Cited

U.S. PATENT DOCUMENTS

| | | | |
|---|---|---|---|
| 6,678,972 B2* | 1/2004 | Naruse et al. | 37/466 |
| 7,651,811 B2* | 1/2010 | Aker et al. | 429/71 |
| 7,810,597 B2* | 10/2010 | Imashige | 180/69.2 |
| 2004/0129466 A1* | 7/2004 | Leifert | 180/65.2 |
| 2006/0214641 A1* | 9/2006 | Cho | H01M 10/4207 320/150 |
| 2008/0060860 A1* | 3/2008 | Murase et al. | 180/65.3 |
| 2009/0078483 A1* | 3/2009 | Grothkopp et al. | 180/68.5 |
| 2009/0283346 A1* | 11/2009 | Katae et al. | 180/68.2 |
| 2009/0314557 A1* | 12/2009 | Takeuchi et al. | 180/65.1 |
| 2010/0122860 A1 | 5/2010 | McKelvey | |
| 2011/0177366 A1* | 7/2011 | Nagasaki | H01M 2/1022 429/83 |
| 2012/0285757 A1* | 11/2012 | Atarashi et al. | 180/68.1 |
| 2013/0075171 A1 | 3/2013 | Noguchi et al. | |

FOREIGN PATENT DOCUMENTS

| | | |
|---|---|---|
| JP | 2003-226494 | 8/2003 |
| JP | 2004-292063 | 10/2004 |
| JP | 2007-211394 | 8/2007 |
| JP | 2009-274651 | 11/2009 |
| JP | 2011-81981 | 4/2011 |
| WO | 2011/089934 | 7/2011 |
| WO | 2011/158618 | 12/2011 |

OTHER PUBLICATIONS

International Search Report from PCT/JP2013/071666 having a mail date of Sep. 17, 2013.

International Preliminary Report on Patentability with English translation from PCT/JP2013/071666 having a mail date of Feb. 17, 2015.

Supplementary European Search Report for EP 13879430.0 having a mailing date of Jul. 24, 2015.

Official Action for CN App. No. 201380042255.8 having a mailing date of Dec. 2, 2015.

* cited by examiner

INDUSTRIAL VEHICLE

TECHNICAL FIELD

The present invention relates to an industrial vehicle that is driven using a plurality of battery cells arranged in the vehicle body as the power source and includes a counterweight in the vehicle body.

BACKGROUND ART

Patent Document 1 describes a forklift, which is an example of such an industrial vehicle.

The industrial vehicle of Patent Document 1 includes a counterweight at the rear side of the vehicle body to counterbalance a carried load. The counterweight includes an accommodation cavity extending in the lateral direction of the vehicle. The accommodation cavity accommodates a battery.

PRIOR ART DOCUMENTS

Patent Documents

Patent Document 1: Japanese Laid-Open. Patent Publication No. 2009-274651

SUMMARY OF THE INVENTION

Problems that the Invention is to Solve

A battery emits heat when discharging and charging. When the temperature of the battery exceeds a specific temperature, deterioration of the battery accelerates. Thus, in industrial vehicles, effective cooling of batteries is desired.

It is an object of the present disclosure to provide an industrial vehicle capable of effectively cooling a battery cell.

Means for Solving the Problems

To achieve the foregoing objective and in accordance with one aspect of the present invention, an industrial vehicle is provided that includes a vehicle body, a plurality of battery cells that is a power source of the industrial vehicle and arranged in the vehicle body, and a counterweight arranged in the vehicle body. The counterweight includes a weight portion and a weight body that projects from the weight portion. The battery cells are arranged on both sides of the weight body and thermally coupled to the weight body.

MODES FOR CARRYING OUT THE INVENTION

Referring to FIGS. 1 to 4, a forklift, which is one embodiment of an industrial vehicle, will now be described.

In the following descriptions, the terms "front", "rear", "left", "right", "up", and "down" are based on a state in which a forklift operator faces the front of the forklift.

Figure 1:
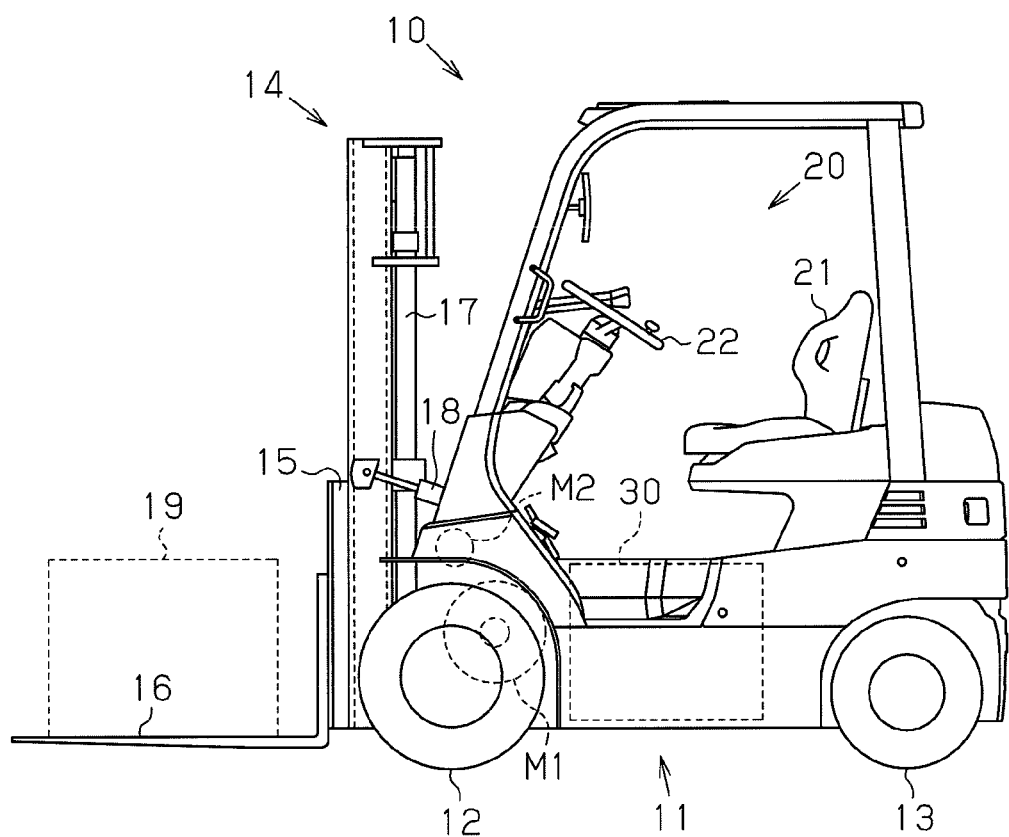
FIG. 1 is a schematic side view showing a forklift of one embodiment.

As shown in FIG. 1, a forklift 10, which is an industrial vehicle, includes a vehicle body 11, drive wheels 12, which are located in the front lower section of the vehicle body 11, steered wheels 13, which are located in the rear lower section of the vehicle body 11, and a material handling device, which is located in front of the vehicle body 11. The material handling device includes a mast 14, which is arranged in front of the vehicle body 11, and a pair of right and left forks 16, which is coupled to the mast 14 by a lift bracket 15. A lift cylinder 17 is coupled to the mast 14 and driven to lift and lower the forks 16 with the lift bracket 15. A tilt cylinder 18 is coupled to the mast 14 and driven to tilt the forks 16 and the mast 14. A carried load 19 is mounted on the forks 16. The vehicle body 11 includes a drive motor M1, which functions as the driving source of the drive wheel 12, and a material handling motor M2, which functions as the driving source of the forks 16.

Further, the vehicle body 11 includes an operator cab 20 at the center. The operator cab 20 includes an operator seat 21, on which the operator (driver) sits. A steering wheel 22 is located in front of the operator seat 21. A battery pack 30 is located under the operator cab 20. The details of the battery pack 30 are given below.

Figure 2:
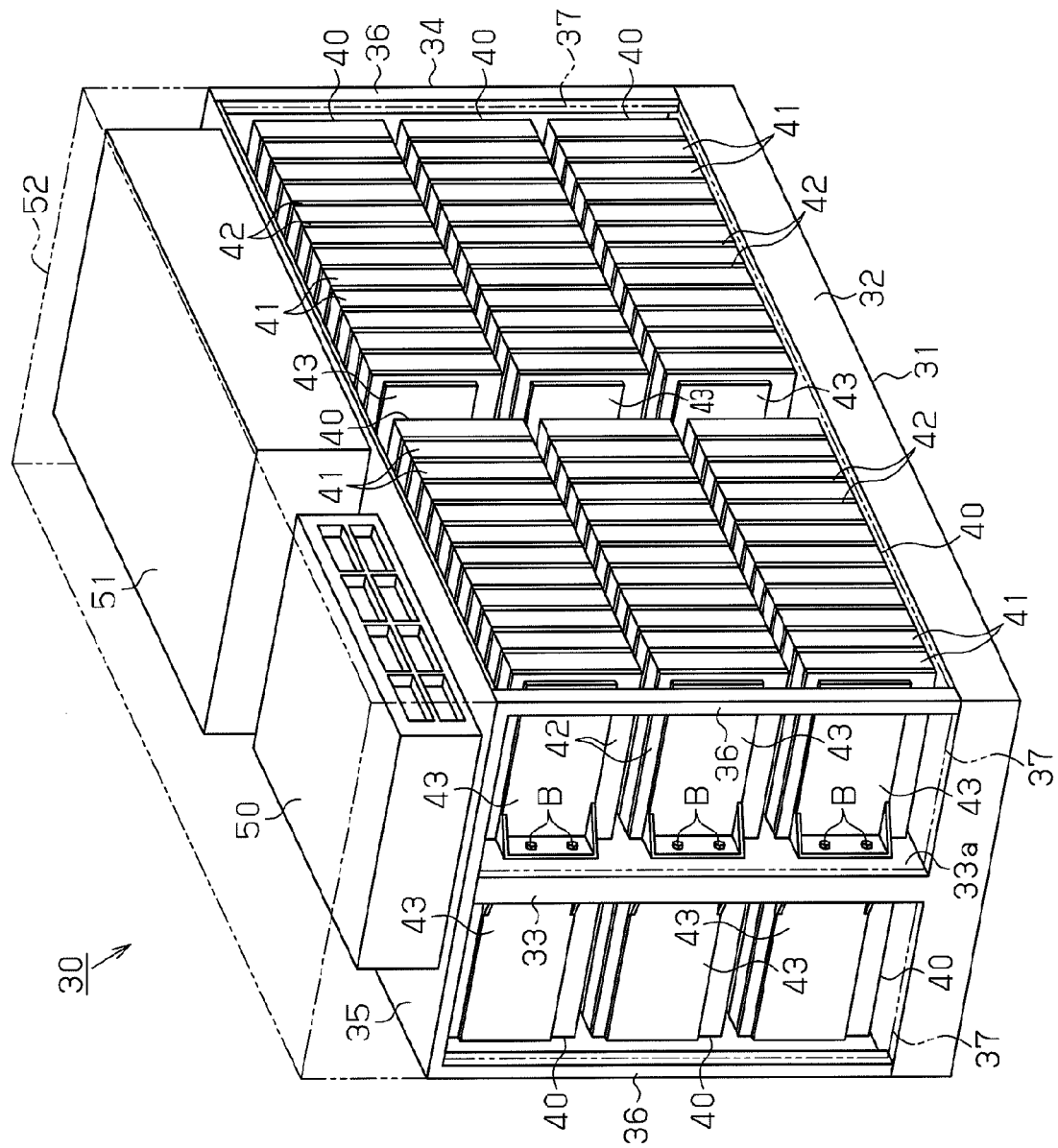
FIG. 2 is a perspective view showing a battery pack of the forklift of FIG. 1.

As shown in FIG. 2, the battery pack 30 includes a counterweight 31 that counterbalances the carried load 19 mounted on the forks 16. The counterweight 31 includes a weight portion 32, which is rectangular as viewed from above, and a plate-shaped weight body 33, which is located at the center of the weight portion 32 in the transverse direction (width direction). The weight body 33 projects vertically from the weight portion 32 and extends in the longitudinal direction of the weight portion 32. The cross-section of the counterweight 31 in the thickness direction of the weight portion 32 has the shape of inverted T. The counterweight 31 is made of iron, for example.

In the counterweight 31, support portions 36 project from the four corners of the weight portion 32, which is a rectangular plate. The support portions 36 support a top plate 35, which is rectangular as viewed from above. The top plate 35 has transverse and longitudinal dimensions that are the same as those of the weight portion 32. The support portions 36 and the top plate 35 form a frame 34, which is supported by the counterweight 31. Lids 37 are arranged between the support portions 36 that are adjacent in the longitudinal direction of the top plate 35 and between the support portions 36 and the weight body 33.

Figure 4:
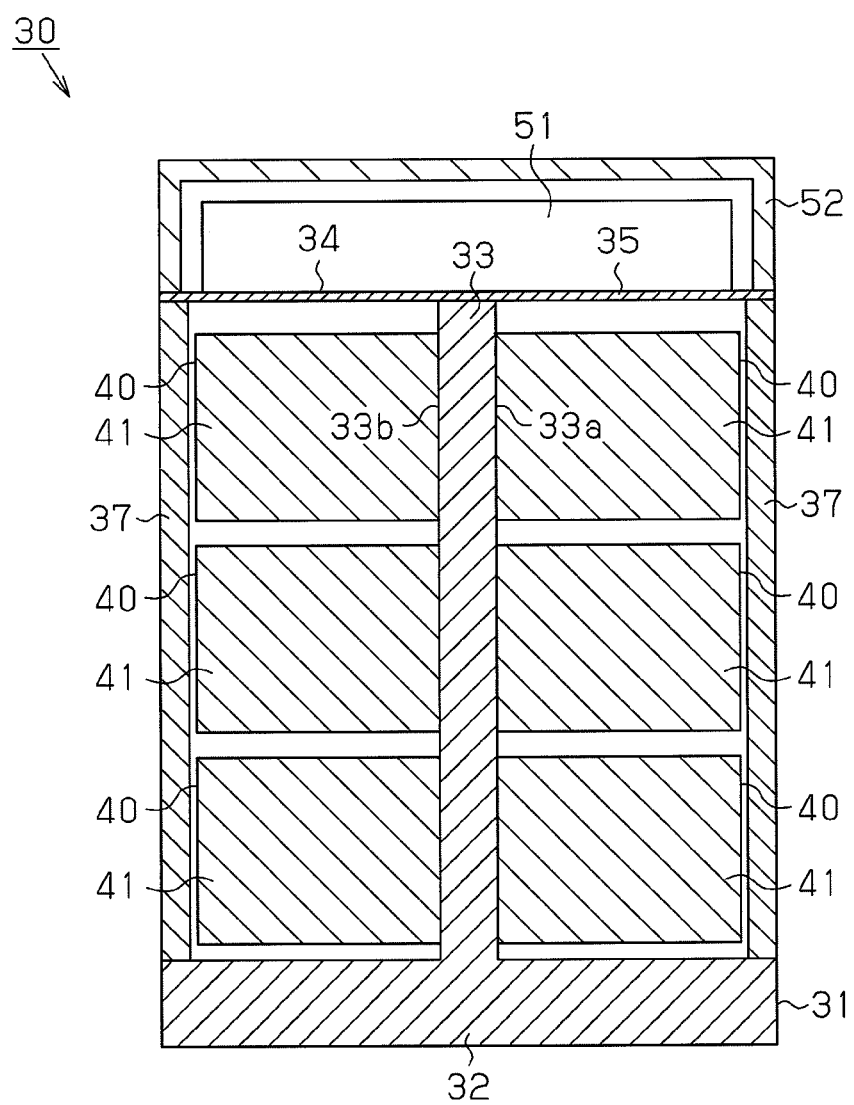
FIG. 4 is a cross-sectional view taken along line 4-4 in FIG. 3.

As shown in FIG. 4, the weight body 33 includes a first mount surface 33a and a second mount surface 33b in the thickness direction. Battery modules 40 are arranged on each of the first mount surface 33a and the second mount surface 33b.

The battery modules 40 are arranged on the opposite surfaces of the weight body 33 in the thickness direction (the first mount surface 33a and the second mount surface 33b). In the present embodiment, six battery modules 40 are arranged on each of the first mount surface 33a and the second mount surface 33b of the weight body 33. Thus, twelve battery modules 40 in total are fixed to the counterweight 31.

Figure 3:
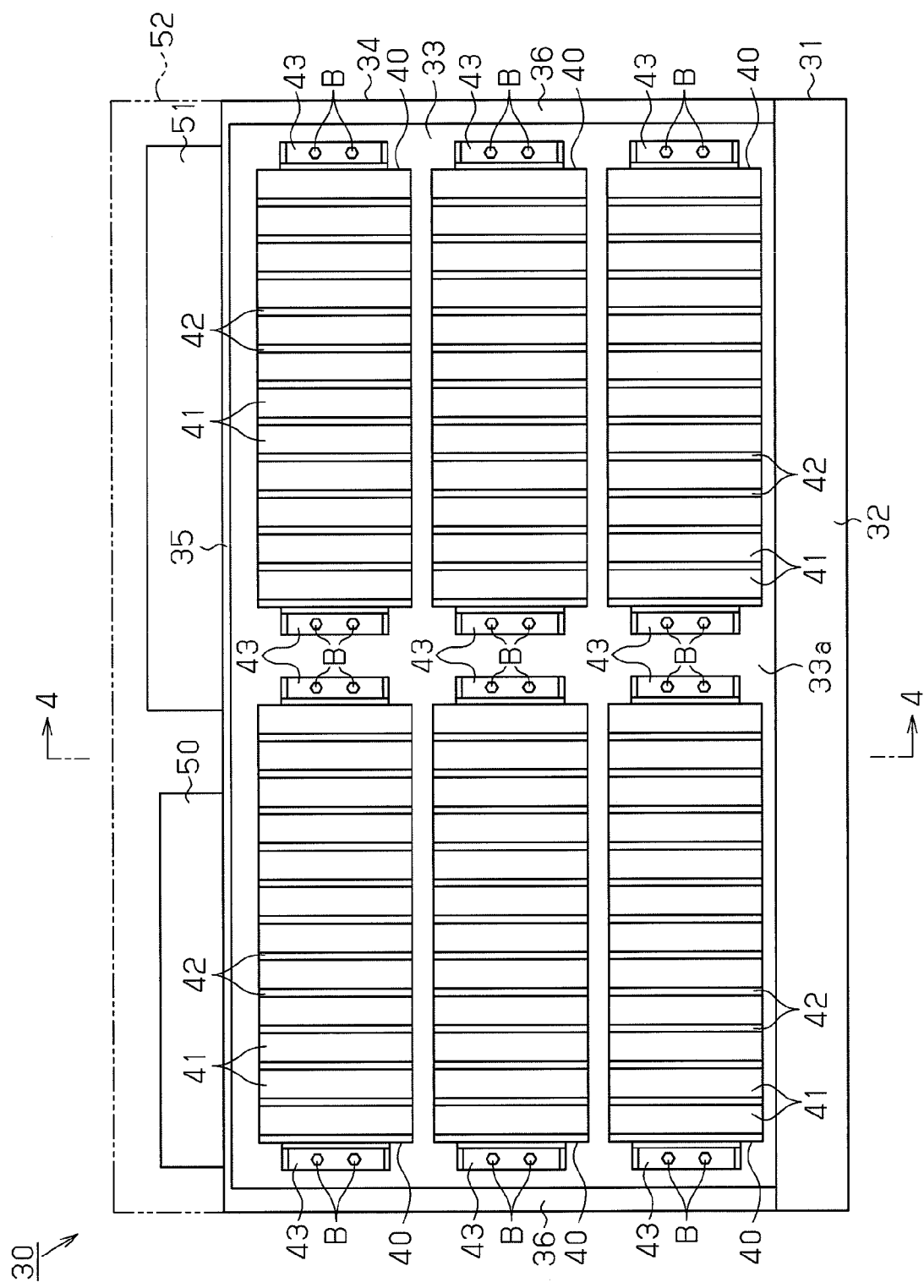
FIG. 3 is a front view showing the battery pack of FIG. 2.

As shown in FIG. 3, each battery module 40 includes rectangular batteries 41 (e.g., lithium-ion secondary batteries and nickel metal hydride batteries), which are battery cells, and heat transfer plates 42, which are thermally coupled to the rectangular batteries 41. The rectangular batteries 41 and the heat transfer plates 42 are arranged alternately. Thus, the rectangular batteries 41 (battery cells) arranged on the opposite sides of the weight body 33 in the thickness direction sandwich the weight body 33. The heat transfer plates 42 are arranged side by side with the rectangular batteries 41 in the arrangement direction of the rectangular batteries 41. The whole surfaces of the heat transfer plates 42 in the thickness direction are in contact with the side surfaces of the adjacent rectangular batteries 41 in the thickness direction. In each battery module 40, brackets 43 are fixed to the rectangular batteries 41 that are located at the opposite ends in the arrangement direction of the rectangular batteries 41. Bolts B are inserted into the brackets 43 and engaged with the weight body 33 to fix the battery modules 40 to the weight body 33. One surface of each rectangular battery 41 in the width direction (the direction perpendicular to the thickness direction and the height direction of the rectangular battery) and one surface of each heat transfer plate 42 in the width direction are thermally coupled to the weight body 33. The weight portion 32 of the present embodiment extends in the directions in which at least the rectangular batteries 41 extend from the weight body 33 (width direction of the rectangular batteries 41).

As shown in FIG. 2, an ECU 50 and a junction box 51 are arranged on the upper surface of the top plate 35. The ECU 50 controls the battery modules 40. A cover 52 arranged on the top plate 35 covers the ECU 50 and the junction box 51. The battery pack 30 structured as described above is arranged in the vehicle body 11 such that the weight portion 32 is located below the rectangular batteries 41 in the direction of gravitational force.

Operation of the forklift 10 according to the present embodiment will now be described.

To drive the forklift 10 and lift and lower the forks 16, the battery modules 40 (rectangular batteries 41) discharge to drive the drive motor M1 and the material handling motor M2. That is, the forklift 10 of the present embodiment is driven using the rectangular batteries 41 as the power source. The heat emitted by the rectangular batteries 41 during discharging and charging of the rectangular batteries 41 is transferred to the counterweight 31 through the heat transfer plates 42. In addition, the heat is transferred to the counterweight 31 from one surface of each rectangular battery 41 in the width direction that is in contact with the counterweight 31.

The above described embodiment has the following advantages.

(1) The rectangular batteries 41 are located on both sides of the weight body 33 and are thermally coupled to the weight body 33. When the rectangular batteries 41 emit heat and the temperature of the rectangular batteries 41 exceeds the temperature of the weight body 33, the weight body 33 absorbs the heat of the rectangular batteries 41. This cools the rectangular batteries 41 and limits overheating of the rectangular batteries 41. The use of the counterweight 31 as a heat absorber effectively cools the rectangular batteries 41.

(2) The rectangular batteries 41 are arranged on each of the first mount surface 33a and the second mount surface 33b of the weight body 33. That is, the opposite surfaces of the weight body 33 in the thickness direction are used to arrange the rectangular batteries 41. Thus, many rectangular batteries 41 can be arranged compared to a structure in which the rectangular batteries 41 are arranged only on one surface of the weight body 33 in the thickness direction.

(3) The weight body 33 of the counterweight 31 is shaped like a plate. Thus, a plurality of rectangular batteries 41 can be arranged in arrays on the weight body 33. This increases the arrangement efficiency of the rectangular batteries 41.

(4) The weight body 33 projects from the weight portion 32. The weight body 33 can exchange heat with the weight portion 32. This limits accumulation of heat in the weight body 33, which absorbs the heat of the rectangular batteries 41. In addition, the arrangement of the weight portion 32 increases the surface area of the counterweight 31. This increases the heat emission area of the counterweight 31.

(5) The weight portion 32 extends in the directions in which at least the rectangular batteries 41 extend from the weight body 33 (width direction of the rectangular batteries 41). This improves the stability in installation of the battery pack 30.

(6) The weight portion 32 is located below the rectangular batteries 41 in the direction of gravitational force. This allows the heat to move downward from the rectangular batteries 41 in the direction of gravitational force.

(7) The counterweight 31 is conventionally installed in an industrial vehicle for material transfer to counterbalance the load 19. The counterweight 31 is thermally coupled to the rectangular batteries 41. This allows the counterweight 31 to function as a heat absorber that absorbs the heat of the rectangular batteries 41. The use of the counterweight 31, which is an existing component of the industrial vehicle, effectively cools the rectangular batteries 41 without increasing the number of components.

(8) The heat transfer plates 42 are arranged side by side with the rectangular batteries 41. This allows the counterweight 31 to absorb heat from the rectangular batteries 41 through the heat transfer plates 42.

The present embodiment may be modified as follows.

Cylindrical batteries or laminated rechargeable batteries may be used as battery cells.

The weight portion 32 may be omitted.

As long as a plurality of battery cells (rectangular batteries 41) can be arranged on both sides of the weight body 33, the weight body 33 may have any shape. In addition, the weight portion 32 may have any shape as long as the weight body 33 can project from the weight portion 32 and the weight portion 32 extends in a direction that differs from the projecting direction of the weight body 33.

Figure 5:
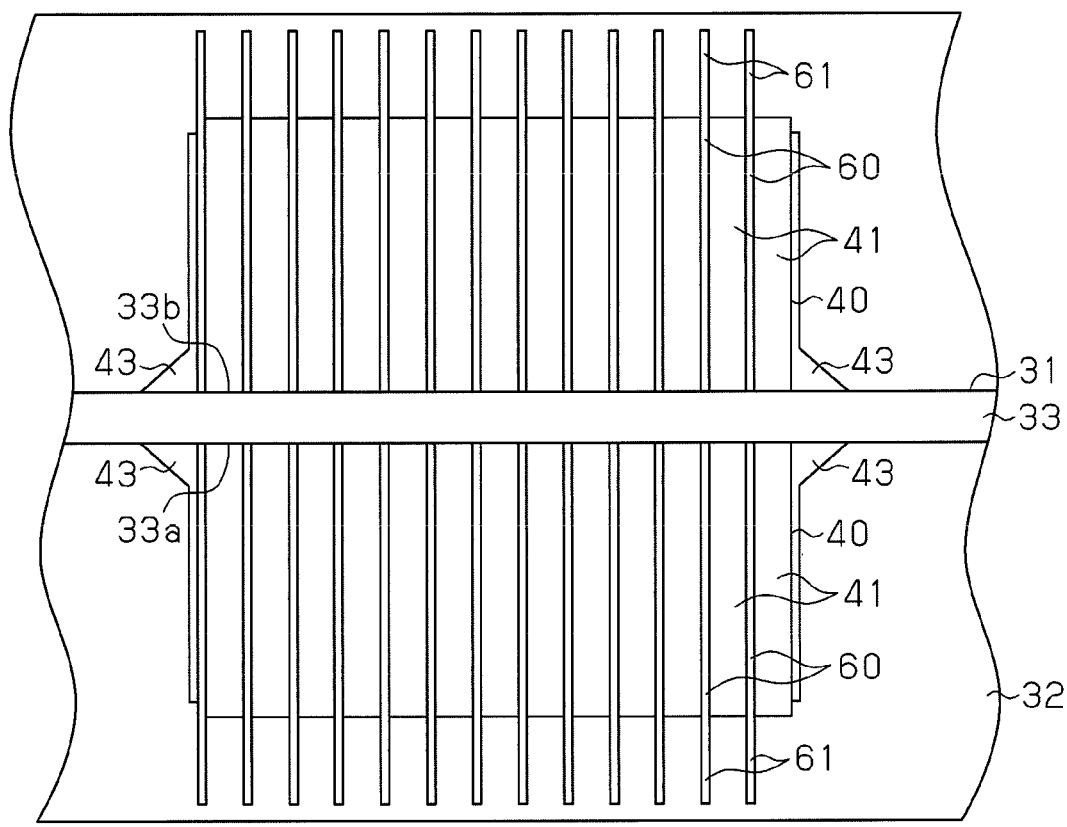
FIG. 5 is a plan view showing a battery module of a modification.

For example, as shown in FIG. 5, the heat transfer plates 42 may be modified such that heat transfer plates 60 have a dimension in the width direction (projecting direction from the weight body 33) that is greater than the dimension of the rectangular batteries 41 in the width direction (projecting direction from the weight body 33). Accordingly, a portion of each heat transfer plate 60 may project from the surface of each rectangular battery 41 that is opposite to the surface thermally coupled to the counterweight 31 (one surface in the width direction). In this case, projection sections 61 of the heat transfer plates 60 that project from the rectangular batteries 41 exchange heat with the surrounding heat medium and dissipate the heat emitted by the rectangular batteries 41. This effectively cools the rectangular batteries 41. In addition, the weight body 33 and the projection sections 61 of the heat transfer plates 60 cool the rectangular batteries 41 on the opposite sides of the rectangular batteries 41 in the width direction. This reduces temperature difference in the rectangular batteries 41.

The industrial vehicle is not limited to the forklift 10. The industrial vehicle may be an excavator, for example.

What is claimed is:
1. An industrial vehicle comprising:
a vehicle body;

a plurality of battery cells that define a power source of the industrial vehicle and are arranged in the vehicle body; and a counterweight arranged in the vehicle body, wherein the counterweight includes a weight portion and a weight body that projects from the weight portion, and the plurality of battery cells contact at least two sides of the weight body so as to be thermally coupled to the weight body such that the weight body absorbs excess heat from the plurality of battery cells through the at least two sides of the weight body.

2. The industrial vehicle according to claim 1, wherein the weight body is a plate.

3. The industrial vehicle according to claim 1, wherein the weight portion is rectangular, the weight body is located at a center of the weight portion in a transverse direction, and the plurality of battery cells are fixed to the weight body.

4. The industrial vehicle according to claim 1, wherein the counterweight is arranged in the vehicle body such that the weight portion is located below the plurality of battery cells in a direction of a gravitational force.

5. The industrial vehicle according to claim 1, further comprising a heat transfer plate that is sandwiched between the plurality of battery cells and thermally coupled to the weight body so as to allow heat from the plurality of battery cells to pass through the heat transfer plate and to the weight body where the heat is absorbed.

6. The industrial vehicle according to claim 5, wherein a dimension of the heat transfer plate in a direction in which the heat transfer plate extends from the weight body is greater than a dimension of each battery cell in a direction in which the battery cell extends from the weight body.

7. The industrial vehicle according to claim 3, wherein the weight portion includes a top surface from which the weight body projects, mounting surfaces of the weight body are perpendicular to the top surface of the weight portion, and the plurality of battery cells are fixed to the weight portion at the mounting surfaces.

8. The industrial vehicle according to claim 1, wherein the counterweight is configured to counterbalance a carried load mounted on a front of the industrial vehicle.

9. The industrial vehicle according to claim 1, wherein the counterweight and the plurality of battery cells are arranged in the vehicle body such that the weight portion is located below the plurality of battery cells in a direction of a gravitational force.

10. The industrial vehicle according to claim 5, wherein entire side surfaces of the heat transfer plate in a thickness direction are in contact with side surfaces of adjacent battery cells in the thickness direction.

11. An industrial vehicle comprising:

a vehicle body;

a plurality of battery cells that define a power source of the industrial vehicle and are arranged in the vehicle body; and a counterweight arranged in the vehicle body, wherein the counterweight includes a weight portion and a weight body that projects from the weight portion, the weight body includes a first surface and a second surface that is opposite to the first surface, the plurality of battery cells are attached to the first surface and the second surface of the weight body to extend from the first surface and the second surface in opposite directions, and the plurality of battery cells are thermally coupled to the weight body such that the weight body absorbs excess heat from the plurality of battery cells through the first surface and the second surface of the weight body.

* * * * *